United States Patent [19]
Yomogida et al.

[11] Patent Number: 4,564,913
[45] Date of Patent: Jan. 14, 1986

[54] FLEXIBLE TRANSFER MACHINE

[75] Inventors: Toshihiko Yomogida, Kariya; Tsuyoshi Yamashita, Nagoya, both of Japan

[73] Assignee: Toyoda Koki Kabushiki Kaisha, Kariya, Japan

[21] Appl. No.: 580,809

[22] Filed: Feb. 16, 1984

[30] Foreign Application Priority Data

Mar. 23, 1983 [JP] Japan .................................. 58-48586

[51] Int. Cl.$^4$ ...................... G06F 15/46; G05B 19/417
[52] U.S. Cl. ..................................... 364/474; 29/568; 364/468; 364/478
[58] Field of Search ................................ 364/131–133, 364/138, 148, 167, 171, 474–475, 468, 478; 29/33 P, 428–431, 563–564, 564.1, 568, 711, 771; 414/134–136; 408/34, 42–44

[56] References Cited

U.S. PATENT DOCUMENTS

| | | | |
|---|---|---|---|
| 4,100,597 | 7/1978 | Fleming et al. | 364/474 |
| 4,163,313 | 8/1979 | Matsuno et al. | 408/44 X |
| 4,237,598 | 12/1980 | Williamson | 29/568 |
| 4,309,600 | 1/1982 | Perry et al. | 29/33 P X |
| 4,369,563 | 1/1983 | Williamson | 29/568 |
| 4,472,783 | 9/1984 | Johnstone et al. | 364/474 |
| 4,473,883 | 9/1984 | Yoshida et al. | 364/474 |

Primary Examiner—Gary V. Harkcom
Attorney, Agent, or Firm—Oblon, Fisher, Spivak, McClelland & Maier

[57] ABSTRACT

A transfer machine is provided with a plurality of machining units disposed in positions to correspond respectively to machining stations which constitute parts of a transfer line. Each of programmable sequence controllers respectively associated with the machining units has a program memory storing a plurality of workpiece-dependent control programs and controls the operation of an associated one of the machining units in accordance with one of the workpiece-dependent control programs designated by a data processor. The data processor is provided with a memory which stores part numbers of the workpieces respectively held on the machining stations and the kinds of machining cycles in which each of the workpieces is scheduled to be machined respectively at the machining stations. Each time the transfer line performs one-pitch transfer of the workpieces therealong, the data processor rewrites the part numbers being stored in the memory so as to renew part numbers of the workpieces being respectively held on the machining stations. The data processor then outputs program designation data based upon the part numbers and the kinds of machining cycles scheduled in the memory, so that each of the sequence controllers controls the associated machining unit in accordance with one of the workpiece-dependent control programs selected by the program designation data.

5 Claims, 6 Drawing Figures

FIG.2(a)

| PART # \ STATION # | 1 | 2 | 3 | 4 | 5 | MVT |
|---|---|---|---|---|---|---|
| 1 | 1 | 3 | 5 | 6 | | |
| 2 | 6 | 3 | 7 | 7 | | 2 |
| 3 | 5 | 1 | 6 | 3 | | 3 |
| ---- | 2 | 3 | 7 | ---- | ---- | 7 |
| 99 | 6 | 2 | 4 | 3 | | |

FIG.2(b)

| | MSIT |
|---|---|
| ADms | 1 |
| ADms+1 | 3 |
| ADms+2 | 5 |
| ADms+3 | 6 |
| ADms+4 | ✻ |

FIG.2(c)

| | WNT |
|---|---|
| ADwn | 3 |
| ADwn+1 | 44 |
| ADwn+2 | 27 |
| ADwn+3 | 7 |
| ADwn+4 | 35 |
| ADwn+5 | 12 |
| ADwn+6 | 13 |

FLEXIBLE TRANSFER MACHINE

BACKGROUND OF THE INVENTION

1. Field of the Invention

The present invention relates in general to a transfer machine for machining workpieces transferred on a transfer line by a plurality of machining units disposed along the transfer line. More particularly, it relates to a flexible transfer machine of the type wherein each of machining units disposed along a transfer line is capable of performing on each workpiece transferred thereto a machining operation which depends upon the kind of the workpiece.

2. Description of the Prior Art

Where plural kinds of workpieces are machined by a transfer machine which disposes a plurality of machining units in positions to correspond respectively to machining stations on a transfer line, the kinds of machining operation cycles performed at each machining station are different from one another to a small extent, depending upon the kinds of workpieces selectively transfrred thereto. It is therefore necessary to identify the kind of a workpiece transferred to each machining station and to perform an appropriate machining operation corresponding to the identified workpiece kind.

A transfer machine has been known which is capable of identifying the kind of a workpiece transferred to each machining station, by shifting workpiece kind identification signals synchronously with the shifting motion of the workpieces on the transfer line. In this known transfer machine, where the kinds of workpieces to be machined therein reaches more than several-tens in number, a problem is raised in that a controller used therein becomes complicated in circuit construction, or that where such a controller is constituted by a sequence controller of a stored program type, then a stored program prepared therefor becomes very complicated.

More specifically, the plural kinds of workpieces machined by the known transfer machine are similar to one another. Therefore, even where more than fifty kinds of workpieces are processed by the transfer machine, it is usual that the kinds of workpieces machined at each machining station are several to seven or eight at most. In this case, the selection of a machining cycle appropriate to each workpiece kind must be made by a dedicated controller provided at each machining station. However, because programmable sequence controllers used as such a dedicated controller do not have a function to lead its processing operation to various points on a sequence program given thereto depending upon the result of comparison operations, the sequence program would be made voluminous if an attempt is made to discriminate more than fifty workpiece identification codes from one another in accordance with the sequence program for the purpose of selecting an appropriate machining cycle based upon a discriminated one of the identification codes. This would disadvantageously result not only in making the programmable sequence controllers for machining control increased in size, but also in making the programming of the sequence program very troublesome.

SUMMARY OF THE INVENTION

Accordingly, it is a primary object of the present invention to provide an improved transfer machine wherein each of programmable machine controllers respectively dedicated to machining units is relieved of identifying the kind of each workpiece transferred to the associated machining unit and of selecting one of workpiece-dependent machining programs based upon the identified workpiece kind, by making a program selection controller perform such workpiece kind identification and machining program selection in place of the dedicated machine controllers.

Briefly, a flexible transfer machine according to the present invention includes a plurality of machine controllers, which are respectively dedicated to machining units disposed along a transfer line. Each of the dedicated controllers controls the operation of the associated machining unit in accordance with one of workpiece-dependent machining programs being stored in a program memory thereof. A workpiece data input device is provided for inputting data representing the part number of an unfinished workpiece to a program selection controller. Upon completion of one-pitch transfer of previously loaded other workpieces along the transfer line, an unfinished workpiece is loaded onto the transfer line, at which time the workpiece data input device is operated. The program selection controller includes first and second memories. The first memory stores the kinds of machining cycles in which each of the workpieces is scheduled to be machined respectively at machining stations on the transfer line. The second memory stores part numbers of the workpieces respectively held on the machining stations. In response to the transfer line and based upon the data from the workpiece data setting device, the selection controller rewrites the part numbers in the second memory so as to make the same store the part numbers of the workpieces being currently held respectively on the machining stations and searches the first and second memories for the kinds of machining cycles in which the workpieces at the machining stations are to be machined respectively. The searched machining cycle kinds are respectively designated to the dedicated controllers, so that each of the dedicated controllers can control the associated machining unit in accordance with one of the workpiece-dependent machining programs selected by a designated one of the searched machining cycle kinds.

With this configuration, each of the dedicated machine controllers is relieved of identifying the kind of each workpiece transferred thereto and of selecting one of machining programs based upon the identified workpiece kind. This advantageously simplifies a system program given to each dedicated controller, thereby resulting not only in reducing the required capacity of the program memory associated with each dedicated controller, but also in making programming of such a system program easy.

In another aspect of the present invention, each of the dedicated machine controllers is constituted by a programmable sequence controller, while the program selection controller is constituted by a data processor such as a microcomputer and the like. To make the best use of the aforementioned advantages, the programmable sequence controller may be of the type that does not use any data processor such as a microcomputer and the like.

BRIEF DESCRIPTION OF THE ACCOMPANYING DRAWINGS

Various other objects, features and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout the several views, and in which:

FIG. 1 is a block diagram showing a general construction of a flexible transfer machine according to the present invention;

FIGS. 2(a)-2(c) are explanatory views of a machining kind storage table MVT, a machining station identification table MSIT and a part number table WNT which are defined in a memory 22 shown in FIG. 1;

FIG. 3 is a flow chart of a part number setting routine executed by a central processor 21 shown in FIG. 1; and FIG. 4 is a flow chart of a shifting processing routine executed by the central processor 21.

DETAILED DESCRIPTION OF A PREFERRED EMBODIMENT

Figure 1:
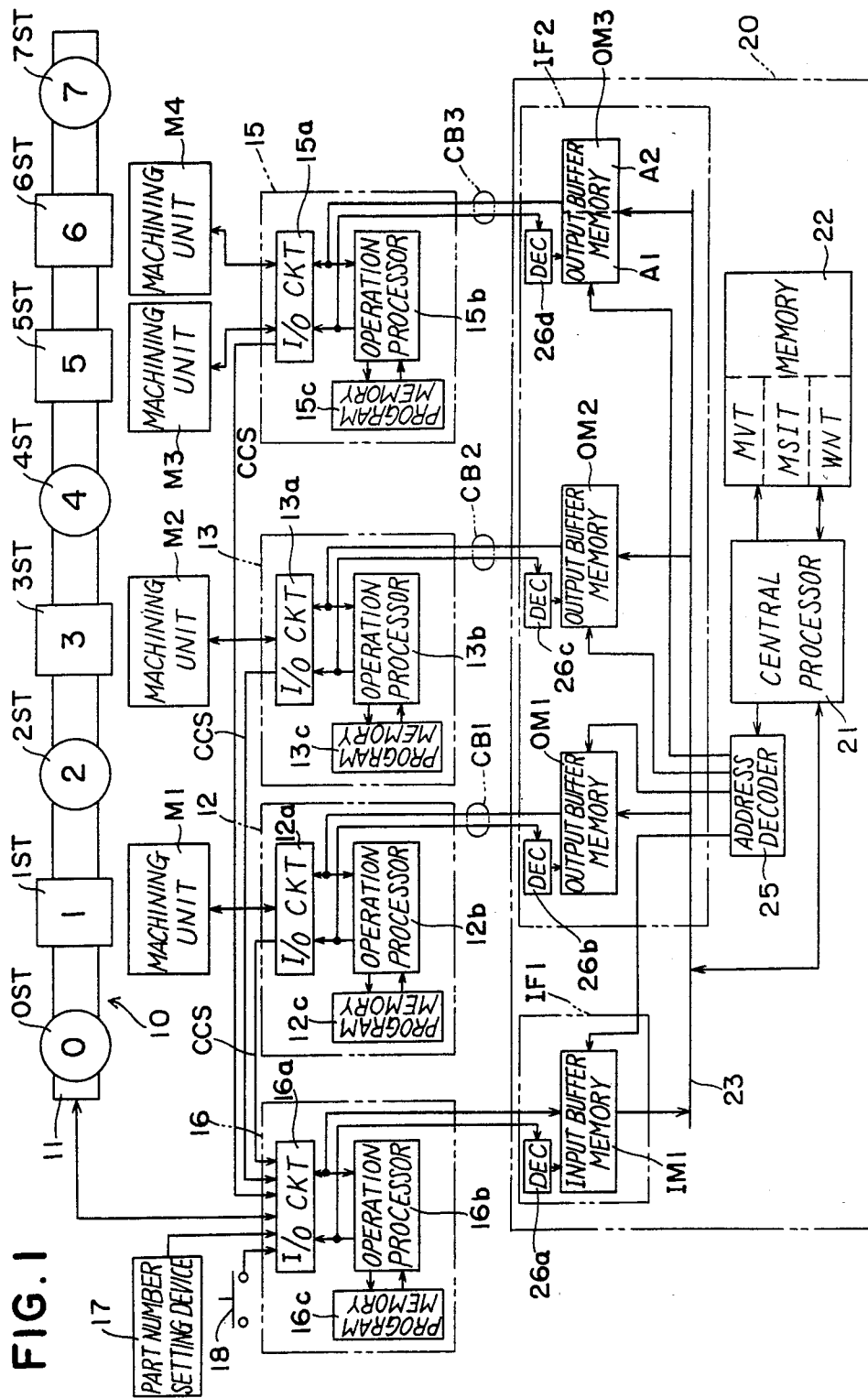

Referring now to the drawings and particularly to FIG. 1 thereof, a reference numeral 10 denotes a transfer line, which simultaneously transfers a plurality of workpieces W therealong through a predetermined transfer pitch each time a transfer drive device 11 is operated. A plurality of stations 0ST-7ST are disposed on the transfer line 10 to constitute parts of the transfer line 10. Of these stations 0ST-7ST, second, forth, sixth and seventh stations 1ST, 3ST, 5ST and 6ST are defined as machining stations, while first, third, fifth and eighth stations 0ST, 2ST, 4ST and 7ST are defined as a loading station, idle stations and an unloading station, respectively.

A plurality of machining units M1-M4 are disposed in positions to correspond respectively to the machining stations 1ST, 3ST, 5ST, 6ST. The machining units M1 and M2 are respectively connected to dedicated programmable sequence controllers 12 and 13, whereas the machining units M3 and M4 are connected in common to a programmable sequence controller 15. The sequence controllers 12, 13, 15 are respectively provided with program memories 12c, 13c and 15c each storing a sequence program. The sequence program incorporates a plurality of workpiece-dependent machining programs therein, so that each of the sequence controllers 12, 13, 15 can control an associated one of the machining units M1-M4 to perform different machining cycles. The differences among these machining cycles are, for example, such that the advanced end of a spindle head provided in each machining unit is changed depending upon the kinds of workpieces and that several spindle heads in a machining unit are selectively advanced depending upon the kinds of workpieces W.

Another programmable sequence controller 16 is further provided for controlling the operation of the transfer line 10. The controller 16 is provided with an input/output (I/O) circuit 16a, to which are connected a part number setting device 17 for setting the part number of a workpiece W which is newly loaded into the transfer line 10 and a setting command switch 18 for instructing the part number to be input.

In order to govern the sequence controllers 12-15 systematically, there is provided a program selection controller 20, which is composed of a central processor (CPU) 21, a memory 22, an address decoder 25, and first and second interfaces IF1 and IF2. The first interface IF1 includes an input buffer memory IM1 and relays data signals from the part number setting device 17 and the setting command switch 18 to the selection controller 20 through the input buffer memory IM1 and an input/output (I/O) bus 23. The first interface IF1 also relays a transfer completion signal synchronous with operation of the transfer line 10 to the selection controller 20 through the input buffer memory IM1 and the I/O bus 23. On the other hand, the second interface IF2 is provided with output buffer memories OM1-OM3, each of which is connected at an output port thereof to I/O signal lines of an associated one of the sequence controllers 12, 13, 15 through an assocated one of connection buses CB1-CB3. Each of the output buffer memories OM1-OM3 is connected to the I/O bus 23 at an input port thereof. Each of the input buffer memory IM1 and the output buffer memories OM1-OM3 is of the type that can perform data write-in and data read-out concurrently. Each of the buffer memories IM1 and OM1-OM3 is selectable by the central processor 21 upon receipt of a selection signal from the decoder 25 and is also selectable by an associated one of the sequence controllers 16, 12, 13 and 15 upon receipt of a selection signal from one of decoders 26a-26d which is connected to the I/O signal lines of the associated one of the sequence controllers 16, 12, 13 and 15.

Thus, the selection controller 20 is enabled not only to read data and signals which have been written by the sequence controller 16 in the input buffer memory IM1, but also to write data in any of the output buffer memories OM1-OM3. The data so written in each of the output buffer memories OM1-OM3 is transmitted as ON/OFF signals to an operation processor 12b, 13b or 15b of an associated one of the sequence controllers 12, 13 and 15.

The memory 22 is formed therein with a machining kind storage table MVT, a machining station identification table MSIT and a part number table WNT. The table MVT stores data indicative of the kinds of machining cycles in which each of workpieces W1-W99 is scheduled to be machined respectively at the machining stations 1ST, 3ST, 5ST and 6ST. The table MSIT stores station numbers of the machining stations 1ST, 3ST, 5ST and 6ST. The table WNT stores part numbers of the workpices respectively occupying all the stations 0ST-7ST.

As shown in FIG. 2(a), the machining kind storage table MVT stores numerals indicative of the kinds of machining cycles which are to be effected respectively at the machining stations 1ST, 3ST, 5ST and 6ST, with respect to each of the workpieces W1-W99. The storage table MVT is formed in a programmable read-only memory (P-ROM), because the data therein is seldom changed once determination is made as to the configuration of the transfer line 10 and the kinds of workpieces W1-W99 to be processed therein.

The machining station identification table MSIT stores station numbers of the machining stations 1ST, 3ST, 5ST and 6ST respectively in its first address ADms and other addresses ADms+1-ADms+3 successive thereto in turn, as shown in FIG. 2(b). This table MSIT is formed also in the P-ROM.

On the other hands, the part number table WNT has storage addresses ADwn-ADwn+7 of the number corresponding to the total number of the stations 0ST-7ST, as shown in FIG. 2(c). This table WNT is formed in a random access memory (RAM), so that data in the table WNT can be rewritten synchronously with transfer movements of the workpieces W.

Figure 3:
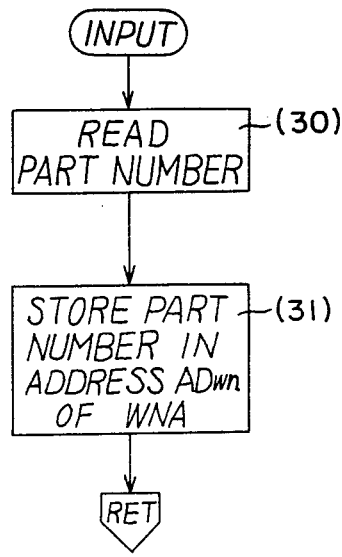
Figure 4:
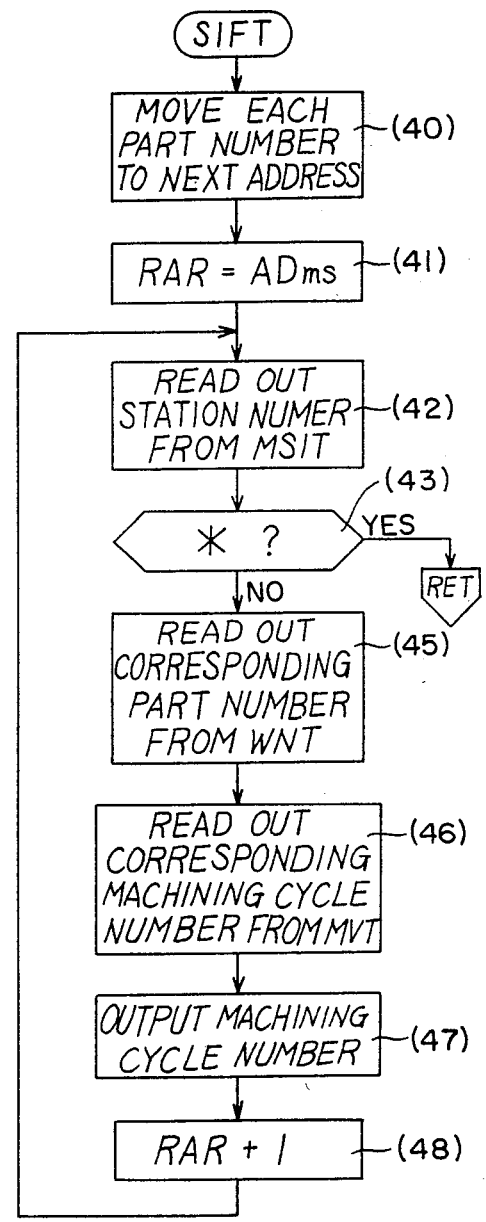

Operation of the apparatus as constructed above will be described hereinafter with reference to flow charts shown in FIGS. 3 and 4. Assuming now that an unfinished workpiece W has been loaded onto the loading station 0ST of the transfer line 10, an operator sets a part number of the workpiece W in the part number setting device 17 and then depresses the setting command switch 18. Thus, the sequence controller 16 outputs the part number data set in the setting device 17 to a predetermined address of the input buffer memory IM1, by executing the sequence program given thereto. The controller 16 also outputs to another predetermined address of the input buffer memory IM1 a signal representing the depression of the setting command switch 18.

The central processor 21 in the program selection controller 20 periodically accesses the input buffer memory IM1 through the execution of a main routine, not shown. Thus, the signal representing the depression of the setting command switch 18 is confirmed by the central processor 21 each time it is written into the input buffer memory IM1, and the central processor 21 initiates the execution of a part number setting routine INPUT shown in FIG. 3 upon confirmation of the signal. That is, the central processor 21 first executes step 30 to read the part number which has been written by the operation processor 16b of the sequence controller 16 into the input buffer memory IM1. Step 31 is then executed, wherein the read part number is written into the first address ADwn of the part number table WNT. The operation of the central processor 21 is then returned to the main routine.

Each time the workpieces W on the transfer line 10 are transferred by the transfer drive device 11 through one pitch, the sequence controller 16 confirms completion of the one-pitch transfer in accordance with the sequence program given thereto and upon such confirmation, writes a transfer completion signal into the input buffer memory IM1. In response to this, the central processor 21 moves its operation from the main routine to a shifting control routine SIFT shown in FIG. 4.

This routine SIFT begins from step 40, in which processings are done to shift each of the part number data which are respectively stored in the storage addresses ADwn-ADwn+6, from one of the addresses ADwn-ADwn+6 to another successive thereto. More specifically, the processing for reading out part number data from one address to write the same in a successive address is repeadedly executed from the address ADwn+6 to the address ADwn in turn. As a result, the part number data of the workpiece W previously loaded onto the loading station 0ST is moved from the address ADwn to the address ADwn+1, for example, and similarly, the part number data of other workpieces W are in turn shifted to be stored addresses which are larger by one in number than those where they were, respectively.

Upon completion of this processing, the central processor 21 in step 41 sets an address register RAR, not shown, with the first address ADms of the machining station identification table MSIT. The address register RAR is provided in the central processor 21 for selectively designating the addresses ADms-ADms+4 of the identification table MSIT from which data is to be read out. Step 42 is then reached, in which station number data is read out from the address designated by the address register RAR. This results in reading out a station number "1" being stored in the first address ADms of the identification table MSIT. When it is ascertained in step 43 that the read-out data is not an end mark "*" as stored at the last address ADms+4 of the identification table MSIT, step 43 is followed by step 45, wherein the part number table WNT is searched for the part number of the workpiece W occupying the machining station whose number was read out in step 42. In this particular instance, since data "1" has been read out as the machining station number, data "3" is read out from address ADWn+1 of the part number table WNT and is recognized as the part number of the workpiece W occupying the machining station 1ST. Thereafter, the central processor 21 accesses the machining kind storage table MVT in step 46 so as to read out data designating the kind of a machining cycle in which the workpiece W3 having been searched in step 45 is to be machined at the machining station 1ST.

In this case, machining cycle kind data "2" is read out by the execution of step 46. Step 47 is next executed to output the machining cycle kind data "2" to the sequence controller 12 which controls the machinings carried out at the machining station 1ST. The content of the address register RAR is increased by one in step 48, whereby the address of the identification table MSIT from which data is to be read out is shifted to another successive thereto before return is made to step 42.

The central processor 21 therefore executes step 42 again to read out another machining station number "3" being stored in the second address ADms+1 of the identification table MSIT. In the same manner as in the case of the station number "1" previously read out, th part number "27" of the workpiece W occupying the machining station 3ST is read out from the part number table WNT in step 45, and data indicative of another machining cycle in which the workpiece W is to be machined at the machining station 3ST is read out from the machining kind storage table MVT in step 46 so as to be output in step 47 to the sequence controller 13 dedicated to the machining station 3ST. By the repetition of these processings, part numbers of the workpieces W which respectivly occupy the machining stations 1ST, 3ST, 5ST ans 6ST are identified in turn, and data indicative of the machining cycles in which the workpieces W occupying the machining stations 1ST, 3ST, 5ST and 6ST are to be machined are in turn output to the sequence controllers 12–15, respectively.

As shown in FIG. 1, the output buffer memory OM3 is provided with a first buffer area A1 for the machining unit M3 and a second buffer area A2 for the machining unit M4, and the central processor 21 is connected to the output buffer memory OM3 so that it can write machining cycle kind data for the machining station 5ST into the first buffer area A1 and machining cycle kind data for the machining station 6ST into the second buffer area A2. This enables the sequence controller 15 to select the machining programs for the machining unit M3 based upon the data in the first buffer area A1 as well as to select the machining programs for the machining unit M4 based upon the data in the second buffere area A2.

Accordingly, each of the sequence controllers 12–15 identifies the kind of a machining cycle designated from the program selection controller 20, in accordance with the sequence program being stored in an associated one of the program memories 12c–15c and executes one of the machining programs which corresponds to the identified machining cycle. Since at most five or six kinds of machining programs are prepared for each machining unit, each of the sequence controllers 12–15 can easily select one of the machining programs in accordance with a simple selection program incorporated in the sequence program given thereto.

Furthermore, each of the sequence controllers 12–15 outputs a cycle completion signal CCS to the sequence controller 16 in accordance with the sequence program given thereto each time the machining unit M1, M2, M3 or M4 associated therewith completes a machining operation cycle. When receiving the cycle completion signals CCS for all of the machining units M1-M4 from the sequence controllers 12–15, the sequence controller 16 enables the transfer drive device 11 to operate, whereby the one-pitch transfer of the workpieces W on the transfer line 10 is performed as described earlier. Upon completion of the one-pitch transfer, the sequence controller 16 writes the transfer completion signal into the input buffer memory IM1, in response to which signal the central processor 21 executes the above-described shifting routine SIFT. The loading of the above-noted unfinished workpiece W onto the loading station OST is performed after the one-pitch transfer, and the operator sets the part number of the workpiece W into the setting device 17. When the setting command switch 18 is then depressed, such is confirmed by the central processor 21 which periodically accesses the input buffer memory IM1, and the part number setting routine INPUT is carried out as described earlier.

It is to be noted that the present invention may be practiced in the case where the machining units M1-M4 disposed for the machining stations 1St, 3ST, 5ST and 6ST are respectively controlled by numerical controllers.

Obviously, numerous modifications and variations are possible in light of the above teachings. It is therefore to be understood that within the scope of the appended claims, the present invention may be practiced otherwise than as specifically described herein.

What is claimed as new and desired to be secured by Letters Patent of the United States is:

1. A transfer machine comprising:
    a transfer line for simultaneously transferring a plurality of workpieces therealong through one transfer pitch whenever operated;
    a plurality of machining stations constituting parts of said transfer line and capable of holding workpieces thereon during machining operations;
    a plurality of machining units associated with said machining stations for machining workpieces held on said machining stations, respectively;
    a plurality of machine controllers respectively associated with said machining units and each capable of controlling the operation of the associated one of said machining units in accordance with one of machining programs, each of said machine controllers including a program memory for storing said machining programs;
    a transfer controller connected to said transfer line for operating the same each time all of the machining units complete machining cycles;
    workpiece data input means for inputting data representing the part number of an unfinished workpiece loaded onto the transfer line; and
    a program selection controller connected to said workpiece data input means, said transfer controller and said machine controllers and including:
        first storage means for storing the kinds of machining cycles in which each of workpieces is scheduled to be machined respectively at said machining stations;
        second storage means for storing part numbers of the workpieces respectively held on said machining stations;
        data rewriting means operable synchronously with the operation of said transfer line and based upon said data from said workpiece data input means for enabling said second storage means to renew said part numbers of the workpieces respectively held on said machining stations;
        program search means for searching said second storage means for the kinds of said workpieces being respectively held on said machining stations and for searching said first storage means for the kinds of said machining cycles which are respectively to be effected on said workpieces identified by said searched kinds of workpieces; and
        program designation means responsive to said searched kinds of machining cycles for designating to each of said machining controllers one of said machining programs which corresponds to one of said searched kinds of machining cycles.

2. A transfer machine as set forth in claim 1, wherein each of said machine controllers comprises:
    a programmable sequence controller having said program memory for storing a sequence program incorporating said machining programs therein and capable of controlling the operation of an associated one of said machining units in accordance with one of said machining programs designated by said program designation means.

3. A transfer machine as set forth in claim 2, wherein said program designation means includes:
    a plurality of output buffer memories respectively associated with said sequence controllers and each capable of storing data indicative of one of said kinds of said machining cycles searched by said program search means, each of said output buffer memories being accessible by an associated one of said sequence controllers for enabling said associated one of said sequence controllers to select one of said machining programs corresponding to said data indicative of said one of said machining cycle kinds and to control the operation of an associated one of said machining units in accordance with said selected one of said machining programs.

4. A transfer machine comprising:
    a transfer line for simultaneously transferring a plurality of workpieces therealong through one transfer pitch whenever operated;
    a plurality of machining stations constituting parts of said transfer line and capable of holding workpieces thereon during machining operations;
    a plurality of machining units associated with said machining stations for machinig workpieces held on said machining stations, respectively;
    a plurality of machine controllers respectively associated with said machining units and each capable of controlling the operation of the associated one of said machining units in accordance with one of machining programs, each of said machine controllers including a program memory for storing said machining programs;

a transfer controller connected to said transfer line for operating the same each time all of the machining units complete machining cycles;

workpiece data input means for inputting data representing the part number of an unfinished workpiece loaded onto the transfer line; and a plurality of output buffer memories each capable of storing data indicative of one of machining cycle kinds and each accessible by an associated one of said machine controllers for enabling said associated one of said machine controllers to control the operation of one of said machining units associated therewith in accordance with one of said machining programs designated by said data indicative of said one of said machining cycle kinds;

first storage means for storing the kinds of machining cycles in which each of workpieces is scheduled to be machined respectively at said machining stations;

second storage means for storing part numbers of the workpieces respectively held on said machining stations; and a data processor connected to said workpiece data input means, said output buffer memories and said first and second storage means and capable of:

(a) rewriting said part numbers being stored in said second storage means based upon said data from said workpiece data input means each time said transfer line performs said one-pitch transfer, for enabling said second storage means to renew said part numbers of the workpieces respectively held on said machining stations;

(b) searching said second storage means for the kinds of said workpieces being respectively held on said machining stations and further searching said first storage means for the kinds of machining cycles which are to be effected respectively on said workpieces identified by said searched workpiece kinds; and (c) writing data indicative of said searched machining cycle kinds respectively in said output buffer memories.

5. A transfer machine as set forth in claim 4, wherein said transfer controller comprises:

a programmable sequence controller connected to said workpiece data input means and operable in accordance with a sequence program given thereto for outputting a transfer completion signal each time said transfer line performs said one-pitch transfer and also outputting said part number being set in said workpiece data input means;

said transfer machine further including:

an input buffer memory connected to said sequence controller for storing said transfer completion signal and said part number and accessible by said data processor for enabling the same to rewrite said part numbers being stored in said second storage means based upon said transfer completion signal and said part number.

* * * * *